United States Patent [19]

Fry

[11] 3,909,729

[45] Sept. 30, 1975

[54] OUTPUT CIRCUITRY FOR DIGITAL INSTRUMENTS

[75] Inventor: Peter William Fry, Dorchester, England

[73] Assignee: Integrated Photomatrix Limited, Dorchester, England

[22] Filed: Aug. 19, 1974

[21] Appl. No.: 498,445

[30] Foreign Application Priority Data

June 14, 1974 United Kingdom.............. 26572/74

[52] U.S. Cl. ................ 328/50; 235/152; 324/99 D; 328/51

[51] Int. Cl.$^2$......................G01R 13/02; G11D 1/00; H03K 21/12

[58] Field of Search .... 328/50, 51; 324/78 D, 83 D, 324/99 D; 340/203, 204, 336; 235/152

[56] References Cited

UNITED STATES PATENTS

| | | | |
|---|---|---|---|
| 3,597,641 | 8/1971 | Ayres | 328/51 X |
| 3,638,001 | 1/1972 | Gordon | 324/78 D X |

*Primary Examiner*—Siegfried H. Grimm
*Attorney, Agent, or Firm*—Klarquist, Sparkman, Campbell, Leigh, Hall & Whinston

[57] ABSTRACT

Output circuitry for a digital instrument includes a counter providing a binary coded digital number which represents a measured value of an electrical parameter and which is periodically updated. The binary coded number in the counter is transferred to an output store in response to periodic transfer pulses. Control means are provided to reduce flicker in a digital display driven from the store by preventing the transfer of the least significant digit of the digital number from the counter to the store in response to a transfer pulse if such digit represents a transition between oddness and evenness when compared with the corresponding digit of the number at the time of the immediately preceding transfer pulse. In a preferred embodiment, the control means is also operative to prevent the transfer of the entire digital number to the store in response to a transfer pulse if the least significant digit is "ZERO" or "NINE" and the transfer of the least significant digit is prevented.

4 Claims, 2 Drawing Figures

OUTPUT CIRCUITRY FOR DIGITAL INSTRUMENTS

BACKGROUND OF THE INVENTION

This invention relates to output circuitry for a digital instrument.

The kind of digital instrument with which the invention is concerned has output circuitry including means providing an output in the form of a binary coded digital number which is periodically updated and a store to which the binary coded number is periodically transferred in response to a transfer pulse.

The invention finds particular application in the case of an instrument having a digital output display. In most instruments having a digital output display, a digital number corresponding to a measured value of an electrical parameter originates in a counter in the form of a binary code (for example, binary coded decimal or "excess-3") representing a decimal number to be displayed. The binary coded number in the counter is periodically transferred into a store in response to transfer pulses, and the decimal display of the instrument is driven from the contents of the store.

The binary coded number transferred to the store from the counter changes in response to changes in the parameter being measured, but also varies in response to extraneous effects such as electrical interference, electrical noise in the circuitry of the instrument and errors in the analogue-to-digital conversion in instruments such as single-ramp voltmeters. The variations in the transferred number arising from the extraneous effects are of course undesirable and lead to flicker in the output display.

SUMMARY OF THE INVENTION

It is a particular object of the present invention to reduce flicker in the output display of a digital instrument by providing output circuitry which tends to reject variations in the number transferred from the counter to the store arising from extraneous effects, without unduly interrupting the transfer of numbers which have changed in response to changes in the parameter being measured.

Accordingly, in one particular form, the present invention provides output circuitry for a digital instrument, including a counter for providing a binary coded digital number representing a measured value of an electrical parameter, a store to which the binary coded number in the counter is transferred in response to a transfer pulse, and control means operative to prevent the transfer of the least significant digit of the digital number from the counter to the store in response to a transfer pulse if such digit represents a transition between oddness and evenness when compared with the corresponding digit of the number in the counter at the time of the immediately preceding transfer pulse.

Output circuitry embodying the invention thus prevents an existing even digit in the least significant place in the store from being replaced by an odd digit unless two odd digits appear in succession. Similarly, the replacement of an existing odd digit in the least significant place in the store by an even digit is prevented unless two even digits appear in succession.

Since changes in the binary coded number provided by the counter which arises from changes in the parameter being measured are relatively permanent compared to variations due to extraneous effects, output circuitry embodying the invention merely introduces a delay of one transfer pulse period between the occurrence of a change in the parameter being measured and a corresponding change in the least significant digit in the store. If the least significant digit before the change and the least significant digit after the change are both even or odd, no delay at all will occur. In any case, all the more significant digits are transferred from the counter to the store without any delay.

Extraneous effects such as interference and noise will, in general, only have an effect for a signal transfer pulse period and will only cause the least significant digit of the number in a counter at the moment of transfer to differ from the correct value by one unit. Output circuitry embodying the invention will prevent this temporary change of one unit from being displayed. Thus, the initial change in the least significant digit will prevent transfer of the least significant digit at the end of the transfer pulse period in which the extraneous effect occurs, and the subsequent change as the count reverts to its correct value will also prevent transfer of the least significant digit at the end of the following transfer pulse period. Since the number in the store at the end of the said following transfer pulse period is in any case the same as the number in the counter at that time, this temporary cessation of transfer is of no importance.

In order to avoid inaccuracy when the least significant digit is ZERO or NINE, in output circuitry embodying the invention the control means may be operative to prevent the transfer of the next more significant digit of the digital number to the store in response to a transfer pulse if the least significant digit is ZERO or NINE and the transfer of the least significant digit is prevented.

Preferably, the control means is operative to prevent the transfer of all the digits of the digital number to the store in response to a transfer pulse if the least significant digit is ZERO or NINE and the transfer of the least significant digit is prevented.

BRIEF DESCRIPTION OF THE DRAWINGS

The invention will now be described in more detail, by way of example, with reference to the accompanying drawings, in which.

DESCRIPTION OF PREFERRED EMBODIMENTS

Figure 1:
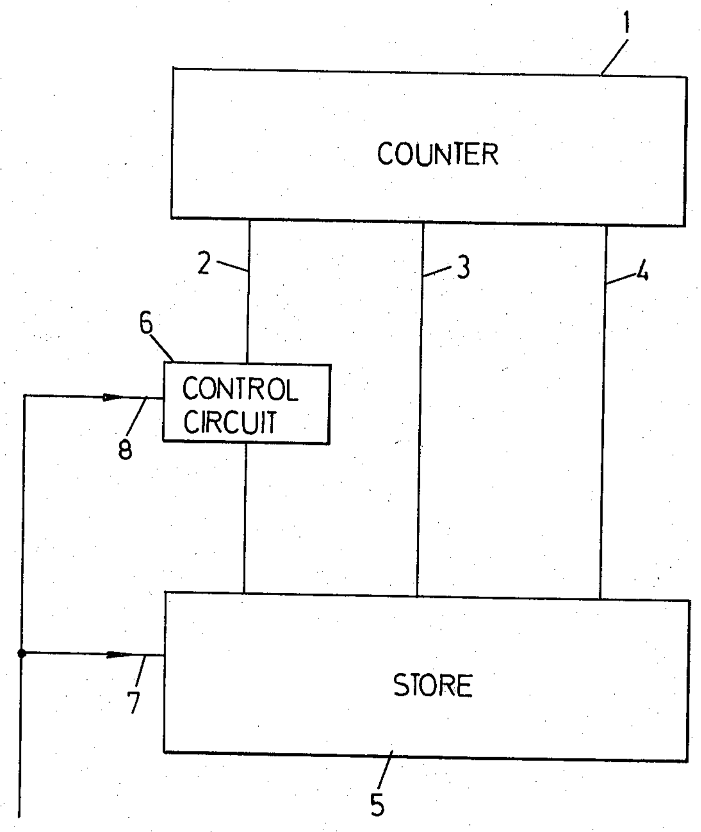
FIG. 1 is a schematic block diagram of basic output circuitry embodying the invention.

Referring to FIG. 1, output circuitry for a digital instrument having a three digit decimal display (not shown) comprises a three decade counter 1 having binary coded decimal outputs 2, 3 and 4 corresponding to the three decades of the counter. The outputs 3 and 4 corresponding to the more significant digits are connected directly to a store 5, and the output 2 corresponding to the least significant digit in the counter 1 are connected to the store 5 via a control circuit 6.

Periodic transfer pulses are applied to an input 7 of the store and to an input 8 of the control circuit 6, and the store 5 has an output for driving the three digit decimal display (not shown).

In operation, the application of a transfer pulse to the input 7 of the store 5 causes the binary coded outputs 3 and 4 of the counter 1 to be written into the corresponding places in the store. However, the least significant digit of the number in the counter 1 is written into the store 5 only if such digit does not represent a transition between oddness and evenness when compared with the corresponding digit of the number in the counter at the time of the preceding transfer pulse, this preceding digit having been stored in the control circuit 6. To this end, the application of a transfer pulse to the input 8 of control circuit 6 initiates a comparison between the digit supplied to the control circuit from the output 2 of the counter 1 and the corresponding digit retained from the preceding transfer period. The control circuit 6 functions to prevent the transfer to the store of the digit delivered on the output 2 of the counter 1 if such digit represents a transition between oddness and evenness when compared with the corresponding digit retained from the immediately preceding transfer pulse period.

The operation of the circuitry shown in FIG. 1 is illustrated by the following table 1, which shows how the transfer is effected in various particular cases. Section A of the table shows how the contents of the store follow the contents of the counter for a small step-like change in the parameter being measured and for a large step-like change in the parameter. Section B of the table shows how the contents of the store follow a more continuously varying input. Section C of the table shows how the circuitry rejects noise and interference which result in a temporary increase or decrease of one unit in the contents of the counter. As can be seen, some errors occur in the least significant digit during a continuously changing signal such as in Section B of the table, but these errors are generally unimportant and acceptable in most cases.

TABLE 1.

| | Number in counter at moment of transfer | Transfer pulse for least sig. decimal | Number in store after transfer pulse |
|---|---|---|---|
| A. | 167 | | |
| | 167 | Yes | 167 |
| | 167 | Yes | 167 |
| | 168 | No | 167 |
| | 168 | Yes | 168 |
| | 168 | Yes | 168 |
| | 235 | No | 238 |
| | 235 | Yes | 235 |
| B. | 167 | | |
| | 167 | Yes | 167 |
| | 174 | No | 177 |
| | 182 | Yes | 182 |
| | 184 | Yes | 184 |
| | 185 | No | 184 |
| | 185 | Yes | 185 |
| | 185 | Yes | 185 |
| C. | 167 | | |
| | 167 | Yes | 167 |
| | 167 | Yes | 167 |
| | 168 | No | 167 |
| | 167 | No | 167 |
| | 167 | Yes | 167 |
| | 166 | No | 167 |
| | 167 | No | 167 |
| | 167 | Yes | 167 |

In the output circuitry described above, a problem is encountered if the noise or interference causes the number in the counter to vary between a number which ends in NINE and the next highest number which ends in ZERO. In this case errors in the next more significant digit will occur as shown in Table 2.

TABLE 2.

| Number in counter at moment of transfer | Transfer pulse for least sig. decimal | Number in store after transfer pulse |
|---|---|---|
| 169 | | |
| 169 | Yes | 169 |
| 169 | Yes | 169 |
| 170 | No | 179 |
| 169 | No | 169 |
| 169 | Yes | 169 |

Figure 2:
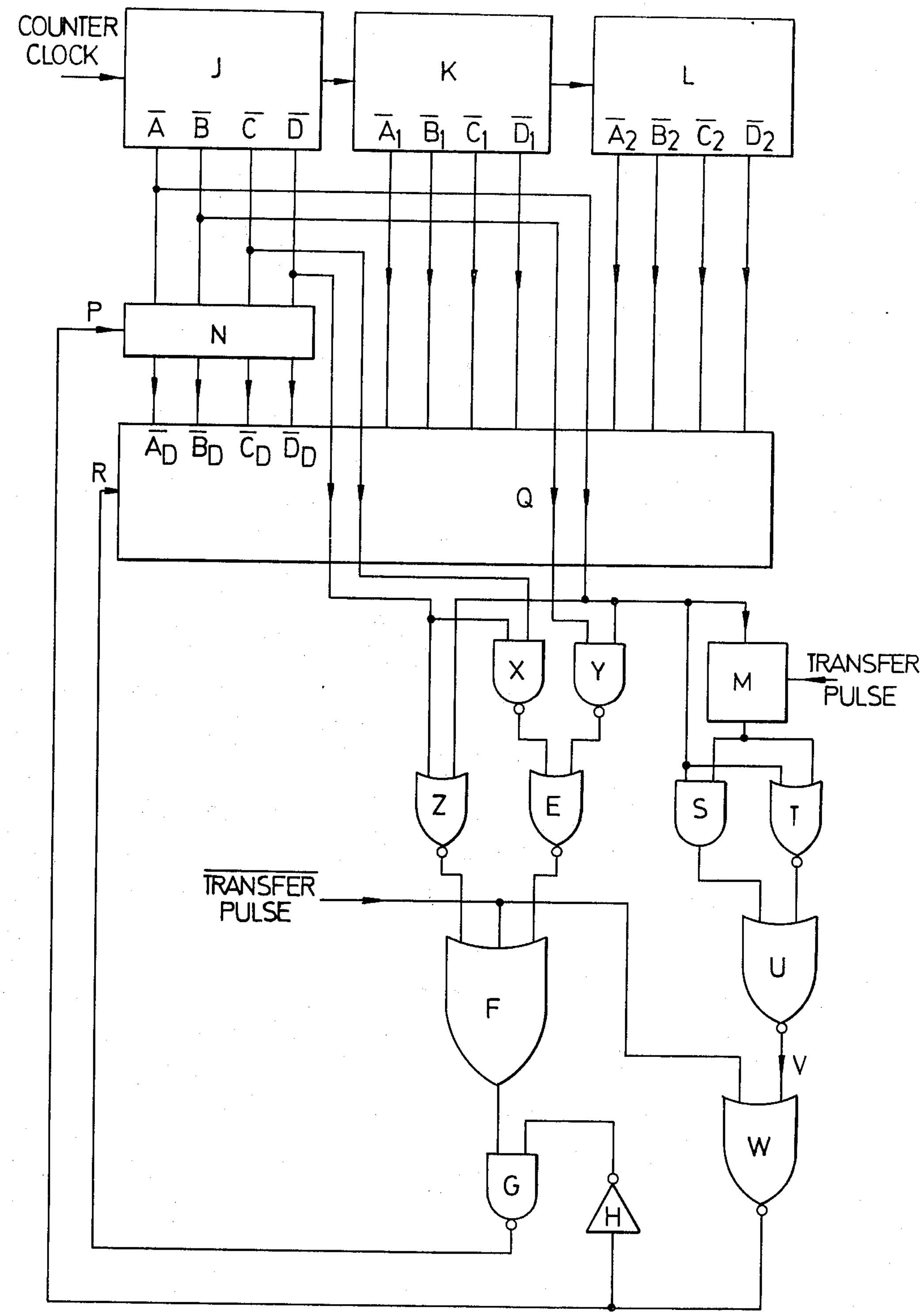
FIG. 2 is a logic circuit diagram of a preferred form of output circuitry embodying the invention.

Accordingly, in a preferred embodiment of the invention illustrated in detail in FIG. 2, the control means is operative to prevent the transfer of the next more significant digit of the digital number from the counter to the store in response to a transfer pulse if the least significant digit is a ZERO or NINE and the transfer of the least significant digit is prevented. This is achieved by providing a control circuit which prevents the transfer of the whole ditigal number from the counter to the store if the least significant decimal is a ZERO or NINE, unless the least significant digit is also transferred.

Referring now to FIG. 2, output circuitry for a digital instrument having a three digit decimal display (not shown) comprises a counter having three decades J, K and L each with four outputs $\overline{A}$, $\overline{B}$, $\overline{C}$ and $\overline{D}$ representing a binary coded decimal digit. The outputs of the decades K and L corresponding to the more significant decimal digits are connected directly to a store Q whose output (not shown) is applied to the decimal display. The outputs $\overline{A}$, $\overline{B}$, $\overline{C}$ and $\overline{D}$ of the decade J corresponding to the least significant decimal digit are connected to the store Q via a four bit staticiser N.

The least significant output $\overline{A}$ of decade J is fed to the signal input of a shift bit M which has a command input for receiving periodic transfer pulses from a suitable source. The output of shift bit M is connected to one input of an AND gate S and to one input of a NOR gate T, the other input of each of the gates S and T being directly connected to the output $\overline{A}$ of decade J. The outputs of gates S and T feed respective inputs of a NOR gate U whose output is connected to one input of a NOR gate W having its other input connected to receive the complement of the periodic transfer pulses applied to shift bit M. The output signal P of NOR gate W feeds a command input of the staticiser N, and also controls the application of a control signal R to a command input of the store Q as hereinafter explained.

Outputs $\overline{A}$ and $\overline{B}$ of the decade J are connected to respective inputs of a NAND gate Y and outputs $\overline{C}$ and $\overline{D}$ are connected to respective inputs of a NAND gate X, the outputs of the gates X and Y being connected to respective inputs of a NOR gate E. Outputs $\overline{A}$ and $\overline{D}$ are also applied to respective inputs of a NOR gate Z, and the outputs of gates Z and E feed respective inputs of an OR gate F having a third input connected to receive the complement of the transfer pulses. The output of gate F is applied to one input of a NAND gate G whose other input is connected to receive the output signal P of gate W via an inverter H. The output of gate G is the signal R applied to the command input of the store Q.

In operation of the FIG. 2 circuit, the output of the counter decade J is stored by the staticiser N in response to the signal P, and the store Q stores the outputs of the counter decades K and L and the output of staticiser N in response to signal R.

Signal P occurs simultaneously with the transfer pulse if the least significant output $\overline{A}$ of decade J has not changed since the preceding transfer pulse, indicating that an odd-to-even number change has not occurred.

Signal R occurs simultaneously with each transfer pulse, unless the least significant decimal is ZERO or NINE, in which case it only occurs if signal P also occurs.

Accordingly, the contents of store Q are updated at the time of each transfer pulse, unless the least significant decimal is a ZERO or NINE, the data with which it is updated coming from the staticiser N in the case of the least significant decimal. Further, staticiser N is only updated if no odd-to-even change has occurred.

The signals P and R are generated as follows: The output $\overline{A}$ is stored by shift bit M in response to a transfer pulse, but does not appear at the output of shift bit M until the transfer pulse has ceased. At the beginning of a transfer pulse, therefore, the inputs to each of gates S and T are the current value of the counter output $\overline{A}$ and its value at the time of the preceding transfer pulse. Gates S, T and U perform a comparison of these values to give a signal V at logic level O if the values are identical and at logic level I if they are different. If signal V is at logic level I, it inhibits gate W from delivering the logic level I at its output whereas, if signal V is at logic level O, gate W produces at its output the signal P as a pulse coincident with the transfer pulse.

Gates X, Y and Z and gate E act on the outputs $\overline{A}$, $\overline{B}$, $\overline{C}$ and $\overline{D}$ of decade J to give a logic I output from gate Z when the least significant decimal digit is a NINE and an output at logic level I when the said digit is a ZERO.

Gate F delivers an output corresponding to the complement of the transfer pulse unless a logic I signal is present on the output of gate Z or E, when the output of gate F becomes logic I. The output of gate F is gated with the inverted signal P in gate G to form the signal R which thus occurs, even if the output of gate F is at logic I, if signal P also occurs.

I claim:

1. Output circuitry for a digital instrument, including:

means providing an output in the form of a binary coded digital number which is periodically updated;

a store to which the binary coded number is transferred in response to a transfer pulse; and control means operative to prevent the transfer of the least significant digit of the digital number to the store in response to a transfer pulse if such digit represents a transition between oddness and evenness when compared with the corresponding digit of the digital number at the time of the immediately preceding transfer pulse.

2. Output circuitry for a digital instrument, including:

a counter for providing a binary coded digital number representing a measured value of an electrical parameter;

a store to which the binary coded number in the counter is transferred in response to a transfer pulse; and control means operative to prevent the transfer of the least significant digit of the digital number from the counter to the store in response to a transfer pulse if such digit represents a transition between oddness and evenness when compared with the corresponding digit of the number in the counter at the time of the immediately preceding transfer pulse.

3. Output circuitry as claimed in claim 1, wherein the control means is operative to prevent the transfer of the next more significant digit of the digital number to the store in response to a transfer pulse if the least significant digit is ZERO or NINE and the transfer of the least significant digit is prevented.

4. Output circuitry as claimed in claim 1, wherein the control means is operative to prevent the transfer of all the digits of the digital number to the store in response to a transfer pulse if the least significant digit is ZERO or NINE and the transfer of the least significant digit is prevented.

* * * * *